(12) United States Patent
Yarlagadda

(10) Patent No.: US 7,327,696 B1
(45) Date of Patent: *Feb. 5, 2008

(54) INTELLIGENT VOICE CONVERTER

(75) Inventor: Madhu Yarlagadda, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 796 days.

This patent is subject to a terminal disclaimer.

(21) Appl. No.: 10/402,637

(22) Filed: Mar. 27, 2003

Related U.S. Application Data

(63) Continuation of application No. 09/658,802, filed on Sep. 11, 2000, now Pat. No. 6,567,419.

(51) Int. Cl.
*H04L 5/14* (2006.01)
*H04L 12/28* (2006.01)
*H04L 12/56* (2006.01)
*H04B 1/56* (2006.01)
*H04J 3/16* (2006.01)
*H04J 3/22* (2006.01)

(52) U.S. Cl. .................. 370/276; 370/401; 370/466
(58) Field of Classification Search ........ 370/352–356, 370/400–401, 466, 276
See application file for complete search history.

(56) References Cited

U.S. PATENT DOCUMENTS

| | | | |
|---|---|---|---|
| 4,701,934 A * | 10/1987 | Jasper | 375/147 |
| 5,333,266 A | 7/1994 | Boaz et al. | |
| 5,497,373 A | 3/1996 | Hulen et al. | |
| 5,592,480 A | 1/1997 | Carney et al. | |
| 5,647,002 A | 7/1997 | Brunson | |
| 5,809,128 A | 9/1998 | McMullin | |
| 5,872,926 A | 2/1999 | Levac et al. | |
| 5,884,262 A | 3/1999 | Wise et al. | |
| 5,951,638 A | 9/1999 | Hoss et al. | |
| 5,983,227 A | 11/1999 | Nazem et al. | |
| 6,009,507 A | 12/1999 | Brooks et al. | |
| 6,055,240 A | 4/2000 | Tunnicliffe | |
| 6,061,347 A | 5/2000 | Hollatz et al. | |
| 6,078,886 A | 6/2000 | Dragosh et al. | |
| 6,137,864 A | 10/2000 | Yaker | |
| 6,144,667 A | 11/2000 | Doshi et al. | |
| 6,175,858 B1 | 1/2001 | Bulfer et al. | |
| 6,181,781 B1 | 1/2001 | Porter et al. | |
| 6,185,565 B1 | 2/2001 | Meubus et al. | |
| 6,230,190 B1 | 5/2001 | Edmonds et al. | |
| 6,233,318 B1 | 5/2001 | Picard et al. | |
| 6,240,448 B1 | 5/2001 | Imielinski et al. | |
| 6,246,758 B1 | 6/2001 | Low et al. | |
| 6,266,342 B1 | 7/2001 | Stacey et al. | |
| 6,269,095 B1 | 7/2001 | Neubauer et al. | |
| 6,269,336 B1 | 7/2001 | Ladd et al. | |
| 6,282,192 B1 | 8/2001 | Murphy et al. | |
| 6,282,270 B1 | 8/2001 | Porter | |
| 6,292,480 B1 | 9/2001 | May | |

(Continued)

FOREIGN PATENT DOCUMENTS

WO    WO 99/28480 A1    12/1999

*Primary Examiner*—Kevin C. Harper
(74) *Attorney, Agent, or Firm*—Darby & Darby PC; Jamie L. Wiegand

(57) ABSTRACT

A voice converter includes upstream and downstream resource managers for allocation half-duplex resources of a full duplex DSP transcoder. The resource managers schedule available upstream or downstream resources and provide transcoded voice data to requesting applications.

19 Claims, 3 Drawing Sheets

U.S. PATENT DOCUMENTS

| | | |
|---|---|---|
| 6,301,245 B1 | 10/2001 | Luzeski et al. |
| 6,304,596 B1 | 10/2001 | Yamano et al. |
| 6,466,581 B1 * | 10/2002 | Yee et al. .................. 370/428 |
| 6,567,419 B1 | 5/2003 | Yarlagadda |
| 6,697,603 B1 * | 2/2004 | Lovinggood et al. ...... 455/13.1 |
| 6,937,616 B1 * | 8/2005 | Rezvani et al. ............. 370/466 |
| 2001/0030958 A1 | 10/2001 | Kichise |
| 2002/0059426 A1 * | 5/2002 | Brinkerhoff et al. ........ 709/226 |
| 2005/0031097 A1 * | 2/2005 | Rabenko et al. ......... 379/93.31 |

* cited by examiner

INTELLIGENT VOICE CONVERTER

CROSS-REFERENCES TO RELATED APPLICATIONS

This patent application is a continuation of U.S. patent application Ser. No. 09/658,802, filed on Sep. 11, 2000 now U.S. Pat. No. 6,567,419, which is related to and claims benefit of applications Ser. No. 09/658,711, filed on Sep. 11, 2000, entitled "Voice Integrated VOIP Systems" (now U.S. Pat. No. 7,095,733), U.S. patent application Ser. No. 09/658,781, filed on Sep. 11, 2000, entitled "Intelligent Voice Bridging" (now U.S. Pat. No. 6,556,563), and U.S. patent application Ser. No. 09/659,233, filed on Sep. 11, 2000, entitled "Message Store Architecture" (now U.S. Pat. No. 6,580,786), the disclosure of which are incorporated by reference.

BACKGROUND OF THE INVENTION

The present invention relates to the field of transcoding of voice data. In general, transcoding is the process of converting one format of the voice data into another.

Internet telephony, known as voice over IP (VOIP) is becoming a realistic, cost effective alternative to the traditional public switched telephone networks (PSTNs).

In general, most VOIP applications use a voice encoding format that is different from the voice encoding format used by PSTN networks. Because of the different voice formats used, many of the functionalities that exist for PSTN are not available to VOIP applications unless the functionality is built directly into the VOIP application.

Voice converters and transcoders (VCs) that convert voice data from one format to another are known and may be used to convert data supplied by a VOIP application to PSTN format to allow the VOIP application to utilize PSTN functionalities such as automatic speech recognition (ASR) and text to speech conversion (TTS). The VC may also convert the output of a PSTN functionality to VOIP format. Existing VCs provide such a service by using dedicated DSP resources. A dedicated DSP resource is an entity that is allocated to the voice channel at the very beginning of a process and remains allocated as long as the channel is in use. The DSP resources used to perform transcode operation are full duplex. Both PSTN as well as VOIP networks are also full duplex in nature. Hence to handle a full duplex network a full duplex DSP resource was created, dedicated and used.

Although almost all of the DSP resources are full duplex in nature, most human interaction is half-duplex in the nature and most of the applications operate based on this half-duplex interaction. For example, almost all of the users who use telecommunication applications such as voice mail and informational services applications do not talk as well as listen at the same time. Accordingly, it is not necessary for an application to dedicate and allocate DSP resources for the entire duration of the application.

Based on the above observations, all of these existing applications use the DSP resource to less than 50% of the their capabilities. From this it is evident that an improved voice converter that may utilize the DSP resources more effectively and efficiently is required. Furthermore such a system should be capable of handling huge number of subscribers.

SUMMARY OF THE INVENTION

By virtue of this invention it is now possible to economically mix and match various functional components from VOIP and PSTN networks.

According to one aspect of the present invention, a method and a mechanism allows transcoding and scheduling two independent voice data streams from two distinct and different subscribers on to the same fill duplex DSP resource.

In one embodiment the voice converter waits for a request for conversion resource on TCP/IP. Based on the type of transcoding that was requested it, the voice converter will allocate a half-duplex resource, perform a transcode operation, and send output data over a User Datagram Protocol (UDP) interface.

According to another aspect of the invention, look-ahead buffers are utilized to mask network latency and provide a continuous stream of data to the DSP resources.

According to another aspect of the invention, data is transferred in packets having session numbers. The session numbers are utilized to identify different data streams using a single DSP resource.

A further understanding of the nature and advantages of the invention herein may be realized by reference to the remaining portions of the specification and the attached drawings.

DESCRIPTION OF THE SPECIFIC EMBODIMENTS

Figure 1:
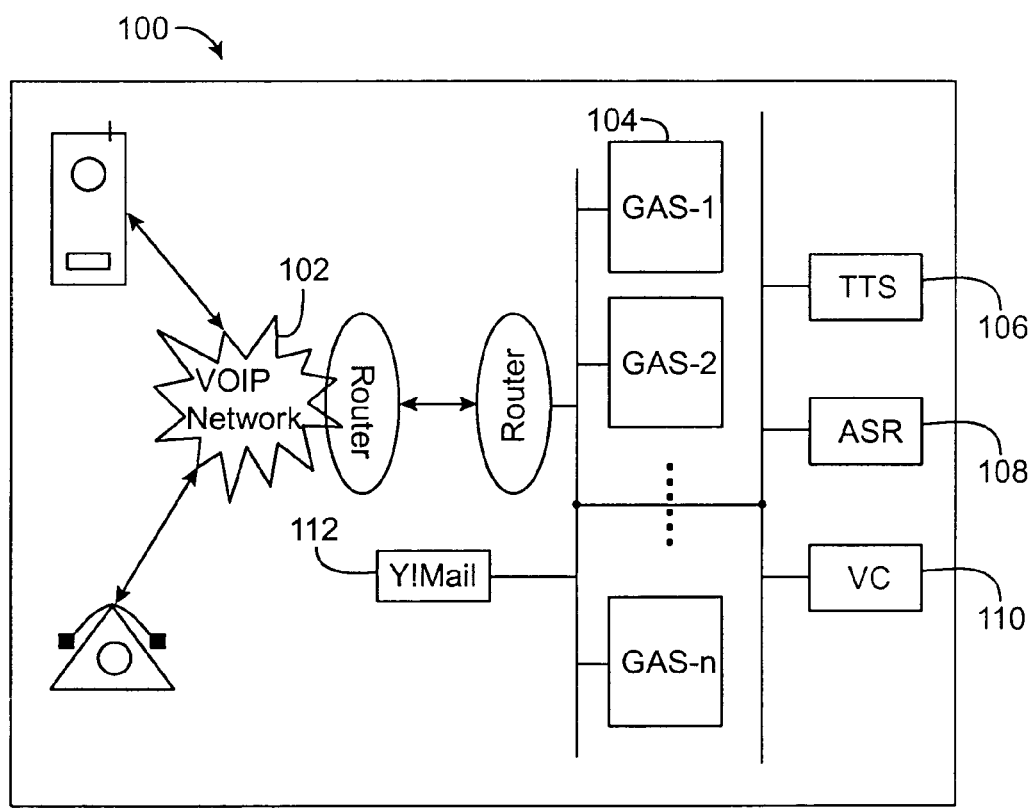
FIG. 1 is a block diagram of a distributed client/server telecommunication system coupled to a managed VOIP network according to one embodiment.

FIG. 1 shows one embodiment of a distributed client server system, which is used to provide telecommunication application services to subscribers over managed VOIP networks. This system is disclosed in the commonly assigned, U.S. Pat. No. 7,095,733 entitled VOICE INTEGRATED VOIP SYSTEM (filed Sep. 11, 2000), which is hereby incorporated by reference for all purposes. This diagram shows the use of a voice converter to integrate TTS and ASR subsystems.

VC (Voice Converter): VC is a server that can convert one voice data format into another. For this particular embodiment, the VC converts pulse code modulation (PCM) voice data (PSTN type data) into G723.1 format (VOIP type data) and vice versa.

GAS (Gateway Access Server): GAS is the server that runs the telecommunication applications. It has a functional component called voice bridging that enables external systems and features to be integrated into the data path of the application running on the GAS.

TTS (Text To Speech Server): The TTS server is responsible for converting text into speech that can be played to the user. Some of the applications that use this feature implement listening to email and other text based content from the phone.

ASR (Automatic Speech Recognition): The ASR server is responsible for recognition of voice data sent to it and translating it to text that is sent back to the requester.

Existing TTS and ASR servers have been designed to provide functionality to PSTNs and therefore are designed to process voice data in PCM format. Accordingly, a VOIP application requires a VC to utilize these resources.

The art of transcoding using standard DSP resources, such as chip sets manufactured by Texas Instruments, is well known and will not be addressed in detail here. The intelligent voice converter of the present embodiment enables VOIP applications to efficiently use external functional modules like TTS and ASR. In the following, an upstream resource transcodes a VOIP data format, such as G723.1 or G729 etc., to standard PSTN format, such as Pulse Code Modulation (PCM), and a downstream resource transcodes standard PSTN formats to VOIP formats.

Figure 2:
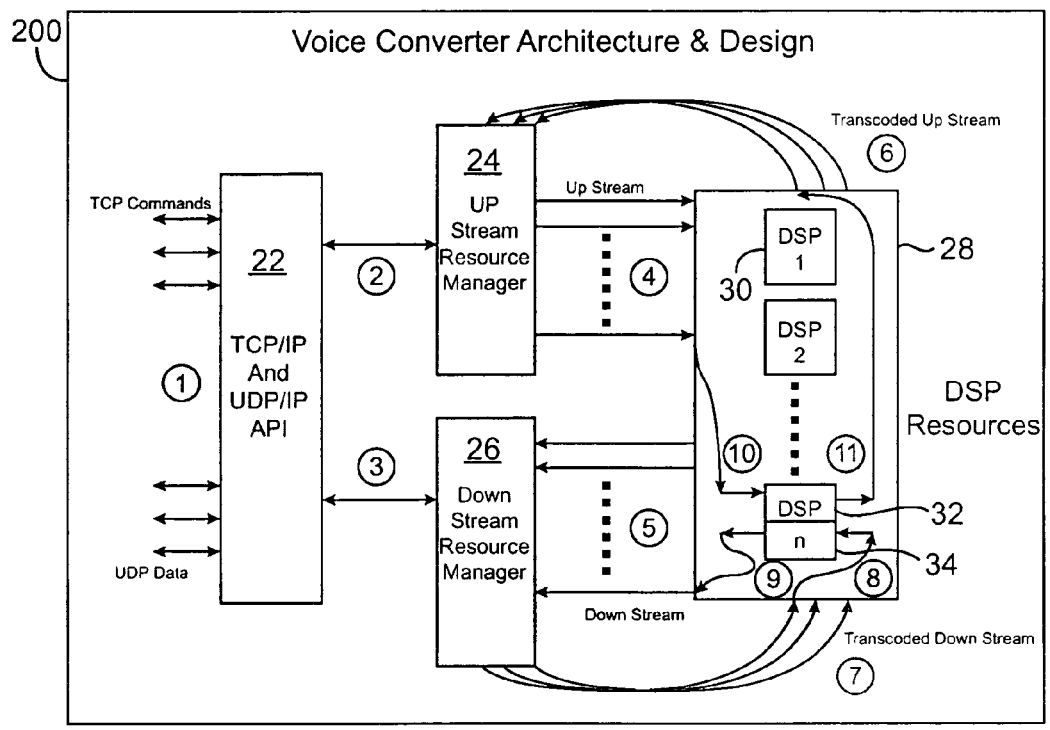
FIG. 2 is block diagram and flow chart of a preferred embodiment of the invention.

FIG. 2 is a block diagram of a preferred embodiment of the Voice Converter (VC) architecture and design. In FIG. 2, a TCP/IP and UDP/IP API (application program interface) 22 couples a VOIP application to an UP Stream Resource Manager (USRM) 24 and to a Down Stream Resource Manager (DSRM) 26. The USRM and DSRM are coupled to a block 28 of digital signal processor (DSP) resources. Each DSP resource 30 is full-duplex and includes an upstream half-duplex block 32 and a downstream half-duplex block 34.

The TCP/IP and UDP/IP API 22 utilizes a TCP port to call the voice converter command port. The voice converter command port will wait on the TCP/IP socket for a request. When the command port receives the request it will analyze the request and will identify whether the request is an upstream request or if it is a down stream request. At this point the voice converter command port will dispatch the request to either the upstream resource manager or to the down stream resource manager.

As stated above, each of the DSP resources 30 is divided into two parts: the upstream resource 32 and a down stream resource 34. Each of these resources is a half-duplex channel which together form a fill duplex DSP resource. Each of the two half-duplex resources 32 and 34 are assigned to a respective resource manager 24 and 26 where each resource manager maintains a table indicating the availability of each half-duplex resource so that an available resource may be scheduled to satisfy application transcoding requests.

Upstream Resource Manager:

The upstream resource manager 24 is responsible for keeping track of up stream DSP resource availability and scheduling. The USRM 24 waits for application requests for up stream conversion and accepts a request if resources are available. The USRM 24 then receives a first buffer of voice data from the application for conversion, keeps the first buffer of data in a look-ahead buffer, and then waits for one more voice data buffer for conversion. After receiving a minimum of two voice buffers filled with data USRM 24 will forward data to the upstream resource to start the conversion.

A look-ahead buffer is kept because, once the conversion is started on a DSP resource 30, buffers must continually be fed to the DSP 30. As described above, the DSP resource 30 is designed for use with a PSTN. In the PSTN, data is supplied at a continuous rate so that the DSP resource 30 is designed to output data at a continuous rate. If no data is received the DSP resource 30 outputs silence frames. Thus, if, for any reason, the next buffer is not ready because of network latency, etc. then the DSP 30 will start generating silence frames as the output and the DSP resource 30 will always output data at continuous bit rate. Silence frames may cause the transcoded voice to be unintelligible to a listener. The look-ahead cache buffer will mask any network latency in receiving data, always making sure that enough data is available to feed to the DSP 30 and hence ensuring the quality of transcoded voice.

Down Stream Resource Manager:

The downstream resource manager 26 is responsible for keeping track of the down stream DSP resource availability and scheduling. Very similar to the upstream resource manager 24, the down stream resource manager 26 will also wait for the application request for downstream conversion, accept the conversion request, and identify an available downstream DSP resource and schedule the downstream on to the DSP resource. Prior to scheduling it maintains a look ahead buffer to mask any network latency.

System Operation:

The operation of the preferred embodiment depicted in FIG. 2 will now be described. Signaling commands from an application are sent to the TCP/IP and UDP/IP interface 22 and all data is sent on UDP. The operation of the USRM 24 will be described first.

The TCP/IP and UDP/IP interface 22 forwards a request from an application to the USRM 24 (arrow 2). The USRM 24 checks its resource availability table to determine which upstream resources are available to service the request. The USRM 24 then schedules an available upstream resource and provides data in VOIP format to the scheduled upstream resource (arrow 10). The USRM 24 also connects (arrow 11) the scheduled upstream DSP resource output back to the UDP stream that sends transcoded data back to the requesting application.

For example, if the requesting application is utilizing the ASR resource then the received voice data in VOIP format is transcoded to PCM format by the upstream resource and sent back to the application for ASR processing.

The operation of the DSRM 26 will now be described. The TCP/IP and UDP/IP interface 22 forwards a request from an application to the DSRM 26 (arrow 3). The DSRM checks its resource availability table to determine which downstream resources are available to service the request. The DSRM 26 then schedules an available downstream resource and provides data in PCM format to the scheduled resource (arrows 7 and 8). The DSRM 26 also connects the scheduled downstream DSP resource output back to the UDP stream that sends transcoded data back to the requesting application.

For example, if the requesting application is utilizing TTS services then PCM data output by the TTS is transcoded to VOIP data and sent back to the requesting application.

Note in this example in FIG. 2, the upstream and downstream resources are scheduled as the two-half duplex blocks of a single DSP resource. Thus, twice the performance is gained from a DSP resource so that only a fraction of the DSP resources required by existing systems are required.

Figure 3:
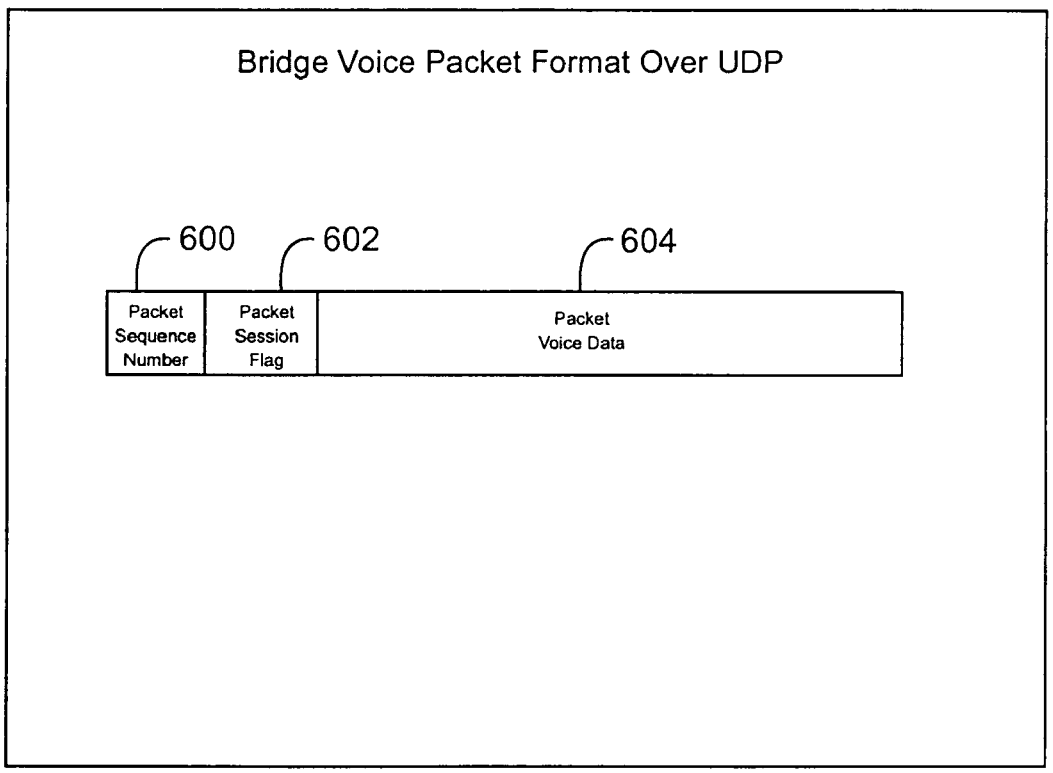
FIG. 3 is a block diagram of the packet format used by a preferred embodiment.

The voice converter uses TCP/IP as the command and control channel. Some commands supported in the embodiment include the following 1. Upstream conversion start
2. Upstream conversion stop
3. Upstream conversion cancel
4. Downstream conversion start
5. Downstream conversion stop
6. Downstream conversion cancel The voice converter sends actual voice data using UDP. The format of the packet is shown in FIG. 3. The packet consists of sequence number that is used to re-arrange packets if they get out of order on the data stream. The packet also has a session flag that is used to keep track of the voice sessions.

By using the session numbers associated with the segments of the voice the application and the voice converter will take care of packets that have higher latency. For example, if a user is listening to email, then the application will play the header with session number one "1". Then the application will continue to play the body of the email and use session number two "2" for it. The advantage of using the session ID is the fact that the application can use multiple simultaneous streams for different sessions. In a given session all packets sent for that session will have same session number.

The invention has now been described with reference to the preferred embodiments. Alternatives and substitutions will now be apparent to persons of skill in the art. For example, different VOIP encoding schemes such as G.726 or CELP encoding may be utilized. Also, commands and data may be exchanged using network protocols other than UDP or TCP/IP. Accordingly, it is not intended to limit the invention except as provided by the appended claims.

What is claimed is:

1. A method for scheduling a single full-duplex DSP having within upstream and downstream half-duplex resources, comprising the steps of:
    scheduling a first user, requiring use of the half-duplex upstream resource, to have access to the half-duplex upstream resource for processing upstream data after a first buffer is full; and
    scheduling a second user, requiring use of the downstream half-duplex resource, to concurrently access the downstream half-duplex resource for processing downstream data after a second buffer is full, so that independent data from the first and second users are concurrently processed by the single, full-duplex DSP.

2. The method of claim 1, further comprising transcoding voice data from a VOIP format to a PSTN format in the scheduled half-duplex upstream resource.

3. The method of claim 2, further comprising routing the transcoded voice data in PSTN format to the first user.

4. The method of claim 1, further comprising transcoding voice data from a PSTN format to a VOIP format in the scheduled half-duplex downstream resource.

5. The method of claim 4, further comprising routing the transcoded voice data in VOIP format to the second user.

6. The method of claim 1, wherein the first user comprises a first application and the second user comprises a second application.

7. A method for scheduling a single full-duplex DSP having upstream and downstream half-duplex resources, the method comprising:
    scheduling a first entity, requiring use of the upstream half-duplex resource, to have access to the upstream half-duplex resource;
    scheduling a second entity, requiring use of the downstream half-duplex resource, to concurrently access the downstream half-duplex resource;
    processing data for the first entity using the upstream half-duplex resource after a first buffer is full; and
    processing data for the second entity using the downstream half-duplex resource after a second buffer is full, wherein the first and second entities are not in communication with each other and the data processed from the first and second entities are concurrently processed by the single, full-duplex DSP.

8. The method of claim 7, wherein processing data for the first entity comprises transcoding voice data from a VOIP format to a PSTN format in the scheduled upstream half-duplex resource.

9. The method of claim 8, further comprising routing the transcoded voice data in PSTN format to the first entity.

10. The method of claim 7, wherein processing data for the second entity comprises transcoding voice data from a PSTN format to a VOIP format in the scheduled downstream half-duplex resource.

11. The method of claim 10, further comprising routing the transcoded voice data in VOIP format to the second user.

12. The method of claim 7, wherein the first entity comprises a first application and the second entity comprises a second application.

13. A system for scheduling a single full-duplex DSP, the system comprising:
    an upstream resource manager configured to schedule a first entity for an upstream half-duplex resource of the full-duplex DSP for processing upstream data after a first buffer is full; and
    a downstream resource manager configured to schedule a second entity for a downstream half-duplex resource of the full-duplex DSP for processing downstream data after a second buffer is full,
    wherein the first and second entities are not in direct communication with each other and data processed from the first and second entities are concurrently processed by the single, full-duplex DSP.

14. The system of claim 13, further comprising an upstream resource availability table, wherein the upstream resource manager is configured to schedule the second entity based on upstream resource availability found in the upstream resource availability table.

15. The system of claim 14, further comprising an downstream resource availability table, wherein the downstream resource manager is configured to schedule the second entity based on downstream resource availability found in the downstream resource availability table.

16. The system of claim 14, wherein upstream resource availability is independent of downstream resource availability.

17. The system of claim 13, wherein the upstream half-duplex resource is configured to transcode data for the first entity from a VOIP format to a PSTN format.

18. The system of claim 13, wherein the downstream half-duplex resource is configured to transcode data for the second entity from a PSTN format to a VOIP format.

19. A system for scheduling a full-duplex DSP, the system comprising:
    an upstream resource manager configured to schedule one or more upstream entities for an upstream half-duplex resource of the full-duplex DSP for processing upstream data after a first buffer is full, wherein the upstream data is continuously provided to the upstream half-duplex resource at a rate sufficient to mask an upstream network data latency at the upstream half-duplex resource and to minimize the upstream half-duplex resource from improperly outputting a silence frame; and
    a downstream resource manager configured to schedule one or more other downstream entities for a downstream half-duplex resource of the full-duplex DSP for processing downstream data after a second buffer is full, wherein the upstream and downstream entities are not in direct communication with each other and the upstream data and the downstream data are concurrently processed by the single, full-duplex DSP.

* * * * *

UNITED STATES PATENT AND TRADEMARK OFFICE
CERTIFICATE OF CORRECTION

PATENT NO. : 7,327,696 B1  Page 1 of 1
APPLICATION NO. : 10/402637
DATED : February 5, 2008
INVENTOR(S) : Yarlagadda It is certified that error appears in the above-identified patent and that said Letters Patent is hereby corrected as shown below:

In column 3, line 33, delete "fill" and insert -- full --, therefor.

Signed and Sealed this

Third Day of June, 2008

JON W. DUDAS
*Director of the United States Patent and Trademark Office*